Patented July 8, 1941

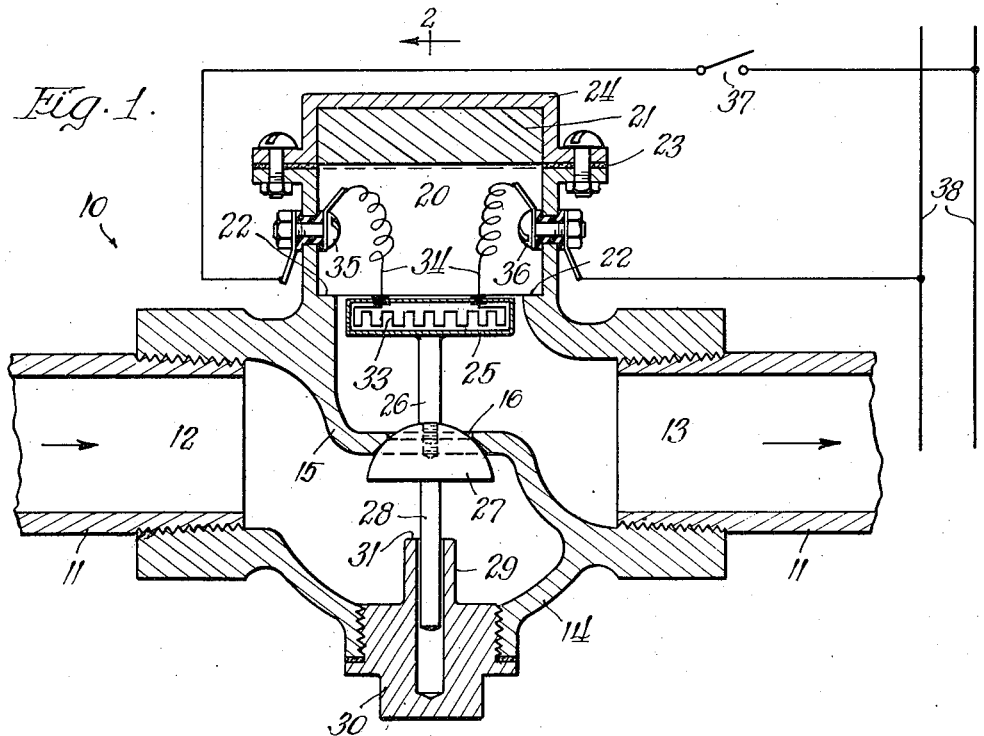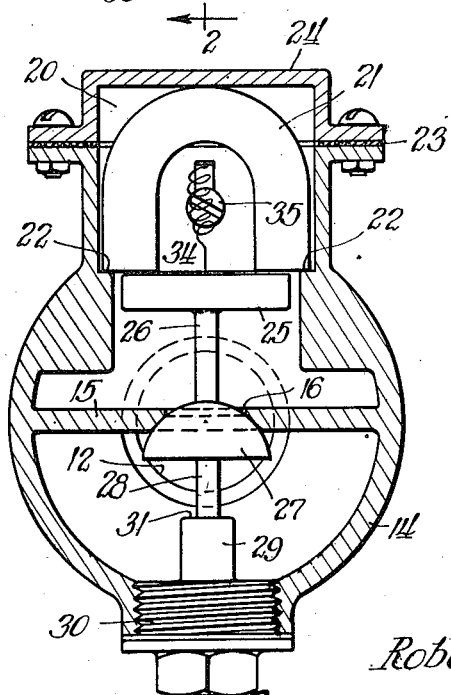

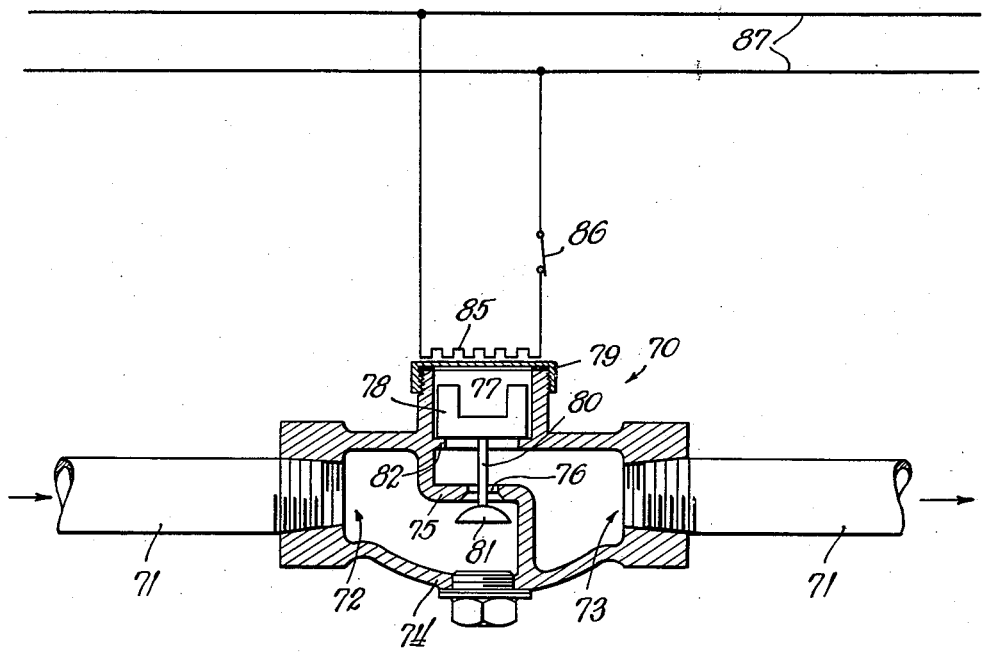

2,248,798

UNITED STATES PATENT OFFICE 2,248,798

APPARATUS FOR CONTROLLING FLUID FLOW

Robert A. Wittmann, Chicago, Ill., assignor to Chicago By-Products Corporation, a corporation of Illinois Application September 6, 1938, Serial No. 228,494

14 Claims. (Cl. 137—139)

My invention relates generally to apparatus for controlling the flow of fluid in a conduit and it has particular relation to valves operated in response to change in the magnetic characteristics of Curie point metals.

Curie point metals include those metals and alloys which normally are ferromagnetic but which when heated sufficiently become substantially non-magnetic. The temperature, or Curie point as it is called, at which this change in magnetic characteristics occurs on heating is a distinct property of each type of Curie point metal. For example, the Curie point of nickel is 350° C. and it is at the same temperature on heating or cooling. The addition of two percent chromium lowers the Curie point temperature and causes it to take place over an interval of temperature, 240° C.–280° C., on heating. In contrast the Curie point temperature of cobalt is at 1100° C. Thus it is seen that Curie point metals with practically any desired magnetic characteristics may be obtained by using various metals and alloys.

Heat operated valves embodying my invention have certain inherent characteristics which admit them to wide application. They have the snap action of solenoid operated valves without the alternating current hum which makes such valves objectionable. In case of current failure, valves embodying my invention will assume the safe or closed position automatically thus eliminating the necessity of providing them with safety devices. The heat expended to operate valves of my construction can be used for heating fluids flowing therethrough, such for instance as fuel gas.

The object of my invention, generally stated, is to provide heat operated valves which are responsive to changes in magnetic characteristics of Curie point metals.

Another object of my invention is to provide heat operated valves which can only fail in the safe or closed position.

Another object of my invention is to provide an electrically controlled valve including a magnetic operating system which can be operated from alternating current without alternating current hum.

Another object of my invention is to utilize the heat absorbability of fluids for shortening the closing period of valves controlling their flow in conduits.

Other objects of my invention will, in part, be obvious and in part appear hereinafter.

Accordingly, my invention is disclosed in the embodiments thereof shown in the accompanying drawings, and it comprises the features of construction, combination of parts, and arrangement of elements which will be exemplified in the constructions hereinafter set forth and the scope of the application of which will be indicated in the appended claims.

For a more complete understanding of the nature and scope of my invention, reference may be had to the following detailed description, taken in conjunction with the accompanying drawings in which:

Figure 1 is a sectional view of a valve illustrating one embodiment of my invention;

Figure 2 is a sectional view taken on line 2—2 of Figure 1;

Figure 3 is a sectional view of a valve illustrating yet another embodiment of my invention;

Figure 4:
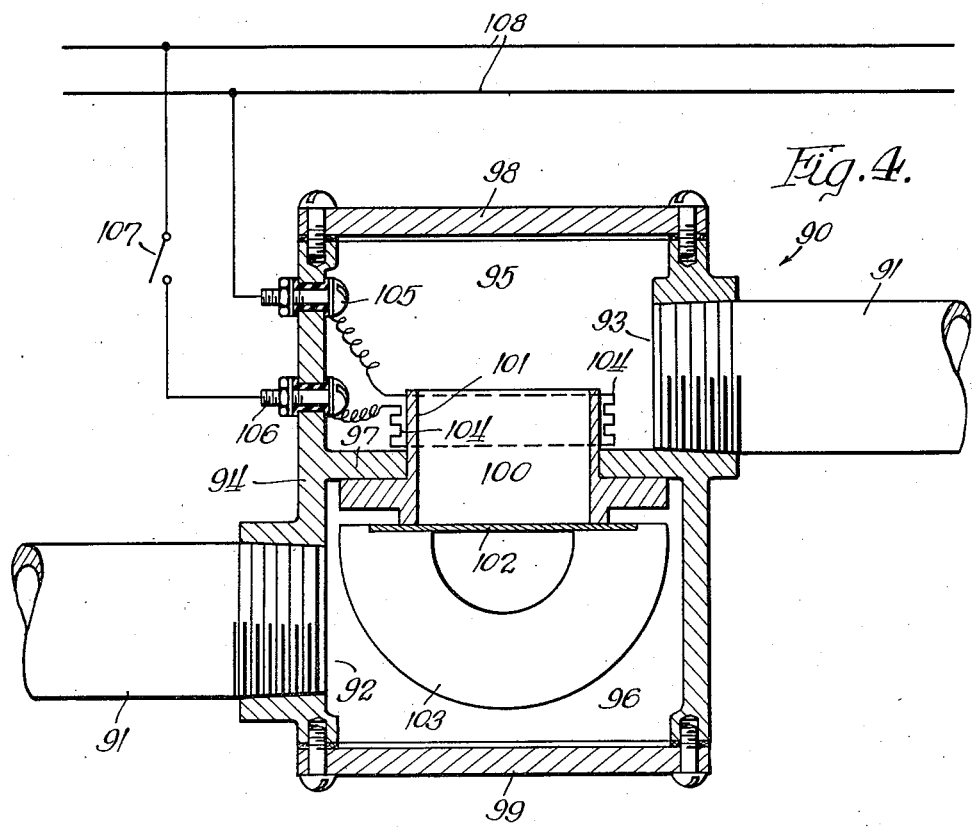
Figure 4 is a sectional view of another type of valve illustrating another embodiment of my invention.

Referring now to Figures 1 and 2 of the drawings it will be observed that a valve shown, generally at 10, is located in a conduit 11 with its inlet 12 and outlet 13 connected as shown. The valve 10 comprises a valve body 14, preferably made out of a non-ferromagnetic material, with a baffle 15 separating the inlet 12 from the outlet 13. In the baffle 15 is a port 16 with its underside ground to form a valve seat. A chamber 20 is formed on the top of the valve body 14 and above the port 16 for holding a permanent horseshoe magnet 21 therein. The poles of the magnet 21 rest on the shoulder 22 to definitely fix it in stationary relationship to the port 16. The chamber 20 is closed off fluid tight by means of a gasket 23 and a cover 24 bolted on its top as shown.

Immediately under the poles of the magnet 21 is a hollow disc 25 of Curie point metal which is adapted to be attracted to these poles. Fixed to the bottom of the disc 25 is a non-ferromagnetic shaft 26 which is screwed into a valve member 27. The valve closing assembly is so made that when the valve member 27 is seated and closing the valve port 16 the upper face of the disc 25 is only a few thousandths of an inch away from the poles of the magnet 21. If desired, the connection between the disc 25 and the valve member 27 can be a spring connection so that, when the disc 25 touches the poles of the magnet 21, the spring tension will hold the valve member 27 tightly in the valve seat of the port 16. Extending from the bottom of the valve member 27 is a guide pin 28, loosely fitted in a guide sleeve 29 of a valve plug 30 screwed into the bottom of the valve body 14. The plug 30 has a shoulder 31 adapted to limit the downward movement of the valve member 27, thereby keeping the disc 25 in the magnetic field of the magnet 21.

An electric heater 33 is provided within the disc 25 for heating it above its Curie point. The heater 33 may be made of nichrome wire and is electrically insulated from the disc 25. The insulated leads 34 of the heater 33 are secured to the terminal screws 35 and 36 running through the valve body 14 and insulated therefrom. The heater 33 is energized through a switch 37 from a pair of conductors 38 which may be connected to any suitable current source, such as a 110 V. alternating current source. The heater 33 may be in series with a thermostat, sail switch or other equipment besides the switch 37, if desired, as will be readily understood.

In describing the operation, it will be assumed that the switch 37 is open and the heater 33 is therefore not energized. The disc 25, not being heated, will be below its Curie point and therefore ferromagnetic and consequently it is attracted to the poles of the magnet 21, thereby holding the valve member 27 in the closed position and closing the port 16. Under these conditions the valve 10 will be closed and no fluid can flow therethrough. Upon closing the switch 37, or otherwise completing an electrical circuit to the heater 33, the heater 33 will heat the disc 25 above its Curie point. As soon as the disc 25 is above its Curie point and, therefore, non-ferromagnetic, its weight, together with that of the shaft 26 and the valve member 27, will cause it to drop allowing the valve member 27 to drop therewith and thereby opening the port 16 so that fluid may flow therethrough. When it is desired to stop the flow of fluid through the valve 10, it is merely necessary to open the switch 37, or otherwise deenergize the heater 33, thus allowing the disc 25 to cool below its Curie point and again become ferromagnetic and it will be again attracted to the poles of the magnet 21. Thus the valve member 27 will again close the port 16 and the closing cycle of the valve 10 is completed.

As the attraction between the disc 25 and the magnet 21 varies inversely as the square of the distance therebetween, when the disc 25 moves up toward and closer to the magnet 21 its movement will become accelerated and a snap action is thus produced. This is very desirable for it tends toward a more perfect closing of the valve 10. It is apparent that, when fluid is flowing through the valve 10, it will be in heat conductive relation with the disc 25. And, since the fluid will usually, if not always, be below the Curie point temperature of the disc 25, it will tend to cool it. This cooling action shortens the time required for the closing of the valve 10 after the heater 33 is deenergized.

With a view to providing a heat operated valve which takes a minimum of time to turn on, I provide a valve of the construction shown, generally, at 70, in Figure 3 of the drawings. The valve 70 is disposed in a conduit 71 with its inlet 72 and outlet 73 connected as shown. The valve 70 comprises a valve body 74, preferably made of a non-ferromagnetic material, with a baffle 75 separating the inlet 72 from the outlet 73. In the baffle 75 is a port 76 with its underside ground to form a valve seat. A chamber 77 is formed on the top of the valve body 74 and above the port 76 for holding a permanent magnet 78. The chamber 77 is closed by a cap 79 of a non-ferromagnetic material. A shaft 80 extends from the magnet 78 for supporting at its lower end a valve member 81 adapted to seat in the valve seat of the port 76. The shaft 80 is of such a length that, when the ends of the poles of the magnet 78 are a few thousandths of an inch away or almost touching the cap 79, the valve member 81 is tightly seated and closing the port 76. A shoulder 82 holds the magnet 78 in proper operative position. In order that the magnet 78 can be attracted to the cap 79 an electric heater element 85, itself composed of Curie point metal, is provided on the top of the cap 79. The heater 85 is connected through a switch 86 to a pair of suitably energized conductors 87. When the switch 86 is closed and current is flowing through the heater 85, it is heated above its Curie point and becomes non-magnetic.

In operation, when the switch 86 is opened, the heater 85 of Curie point metal will be ferromagnetic and the magnet 78 will be attracted thereto, thereby holding the valve member 81 tightly seated in the valve seat of the port 76. The valve 70 is then in the closed position. Upon closing the switch 86, the heater 85 is almost instantly heated above its Curie point and becomes non-magnetic. When the heater 85 becomes non-magnetic, the magnet 78 will drop onto the shoulder 82 and the port 76 will be opened. Now when the switch 86 is opened, the heater 85 will cool and the magnet 78 will be attracted thereto and again the valve 70 will be closed. Since, in this embodiment of the invention the heating element 85 itself is the body of Curie point metal, the time for heating it above its Curie point is relatively short and consequently the operation of the valve 70 is correspondingly fast. It will be understood that the switch 86 may be replaced by or operated in conjunction with a thermostat, liquid level control, sail switch or any other desired device.

With a view to providing a valve, embodying my invention, that is particularly useful in controlling gas flow in cold weather or under low temperature conditions, I provide a valve shown, generally, at 90, in Figure 4 of the drawings. The valve 90 is provided for controlling gas flow in a gas line 91 with its inlet 92 and outlet 93 connected as shown. The valve 90 comprises a valve body 94, made perferably of nonferromagnetic material, which is divided into an upper chamber 95 and a lower chamber 96 by the baffle 97. The chambers 95 and 96 are closed by plates 98 and 99 respectively, which are held in place by screws, as shown. A port 100 joins the upper chamber 95 and lower chamber 96 and is formed by a collar 101 of Curie point metal extending through the baffle 97. The port 100 can be closed by a disc 102 of non-ferromagnetic material which fits against the bottom of the collar 101. The disc 102 is carried on the poles of a horseshoe magnet 103 which is disposed in the lower chamber 96. When the magnet 103 is not attracted to the collar 101, it rests on the plate 99 and within operative distance of the collar 101. An electric heater 104 surrounds the top of the collar 101 and its terminal leads are connected to the screw terminals 105 and 106 which pass through the valve body 94 and are insulated therefrom. The terminals 105 and 106 are in turn connected through a switch 107 to a pair of suitably energized conductors 108. When the switch 107 is closed and current is passing through the heater 104, the collar 101 will be heated above its Curie point and will therefore be non-magnetic.

In operation, when the switch 107 is opened, the heater 104 will be deenergized and the collar 101 will be cooled and therefore become ferromagnetic. The magnet 103 will be attracted thereto and the port 100 will be closed by the disc 102 fitting over the bottom of the collar 101. Accordingly, the valve 90 will be closed and gas flow in the line 91 shut off. Now if the switch 107 is closed, the heater 104 will be energized, thereby heating the collar 101 above its Curie point and causing it to become non-magnetic. When the collar 101 becomes non-magnetic, the magnet 103 will no longer be attracted thereto, and will fall, drawing the disc 102 away from the collar 101 thereby opening the port 100 and allowing gas to flow through the valve 90. In order to close the valve 90, it is only necessary to open the switch 107 thereby deenergizing the heater 104 and allowing the collar 101 to cool below its Curie point and become ferromagnetic. The magnet 103 will then be attracted thereto and the port 100 will be closed by the disc 102.

When valves for gas lines become cold, such as in cold weather, often higher boiling point constituents of these gases condense on the valve seats and other operating parts and thereby give rise to faulty operation, such as sticking shut or failure to close tightly. Thus with gas, such as illuminating and other similar gases, tar deposits are frequently formed. Since, in the valve 90, when gas is flowing therethrough, the collar 101 is continually heated by the heater 104, the formation of tarry and like deposits on it is prevented. Consequently, the valve 90 will not stick because the collar 101 is heated and thus deposits are never present. Another advantage of this valve is that the collar 101 of Curie point metal is directly exposed to the gas flowing through it and hence, when the heater 104 is deenergized, it is rapidly cooled by this flow of gas and the time for closing is shortened accordingly. It is also apparent that the gas flowing through the valve 90 receives heat from the collar 101 and therefore the electric energy supplied to the heater 104 for operation of the valve 90 is not entirely wasted.

Figure 5:
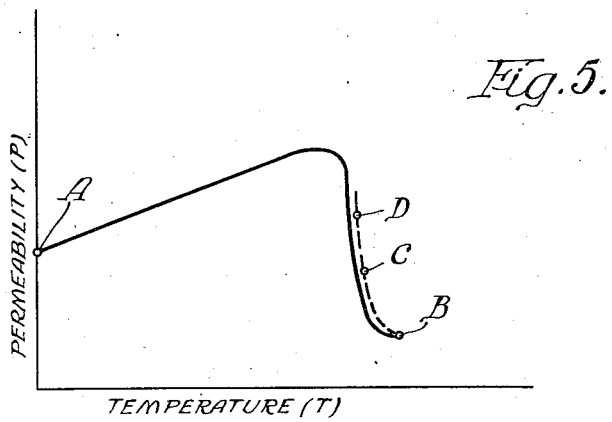
Figure 5 is a curve of permeability versus temperature illustrating the cycle of operation of the valve shown in Figure 4.

The cycle of operation of the valve 90 is made more clear by a reference to the curve shown in Figure 5. Although the curve will be discussed with particular reference to the cycle of operation of valve 90 in Figure 4, it is generally characteristic of the cycles of operation of the other valves previously described. The permeabilities P of the collar 101 of Curie point metal are represented as ordinates of the curve and the temperatures T are represented as abscissae. When the switch 107 is opened the permeability and temperature of the collar 101 are as designated at A. When the switch 107 is closed, and the heater 104 is energized, the collar 101 will be heated and subsequently its permeability and temperature will be that designated at a point B. It is seen that on heating the permeability of the collar 101 rises approximately as a straight-line function of the temperature and after reaching a maximum drops sharply with further increase in temperature. When now the permeability reaches the value at B, the magnet 103 is no longer sufficiently attracted and it will drop sharply, thereby opening the valve 90 and allowing gas to flow. The flow of gas will cool the collar 101 being supplied with heat from the heater 104 and the normal operating permeability and temperature will be as indicated at C. However, the permeability at C will not be sufficient to allow the magnet 103 to rise. Now when the heater 104 is deenergized, the collar 101 will cool and being aided by the cooling effect of the continued gas flow, its permeability will rise sharply as indicated at D and will be sufficient to allow the magnet 103 to be attracted thereto and thereby close the valve 90. After closing, the collar will slowly cool back to the temperature indicated at A. It will be understood that some of the variables affecting the shape of this curve are; size of the heater, particular Curie point metal involved, quantity of gas flowing, temperature of gas flowing, and the ambient temperature in which the valve operates. Accordingly, a wide variety of operating cycles are possible.

It will be seen that on either opening or closing of the valves, snap action is obtained. This is apparent since, when the magnets or members of Curie point metal are released, they drop rapidly and when attracted they accelerate as the distance between them decreases, as hereinbefore described.

Although in all of the foregoing embodiments of my invention the valves are normally closed when the bodies of Curie point metal are not heated above their Curie points and are open when they are heated above their Curie points, it will be understood that by placing the valve closing members above the valve ports, instead of below them, the valves will be normally closed when the bodies of Curie point metal are heated above their Curie points and will be open when the bodies of Curie point metal are not heated above their Curie points.

In all of the instances in which permanent magnets are shown or described, it will be understood that they can be replaced by electromagnets if these are desired for any reason.

Since certain further changes can be made in the foregoing constructions, and different embodiments of the invention may be made without departing from the scope thereof, it is intended that all matter shown in the accompanying drawings or described hereinbefore shall be interpreted as illustrative, and not in a limiting sense.

I claim as my invention:

1. Means for controlling the flow of fluid in a conduit comprising, in combination, valve means in the conduit including a valve member movable between open and closed positions, magnet means operatively connected to and movable with said valve member, a body of Curie point metal stationarily mounted in the field of said magnet means, said valve member being in the closed position when said body of Curie point metal is below its Curie point and in the open position when said body of Curie point metal is above its Curie point, and means for heating said stationarily mounted body of Curie point metal above its Curie point to effect movement of said valve member to the open position.

2. Means for controlling the flow of fluid in a conduit comprising, in combination, valve means in the conduit including a valve member movable between open and closed positions, relatively movable cooperating magnetic members one being a permanent magnet and the other being a body of Curie point metal, said valve member being operatively connected to and movable with one of said magnetic members, and circuit means for connecting an electrical current source across said body of Curie point metal for heating the same above its Curie point by current flow therethrough to change its magnetic characteristics and thereby effect control of movement of said valve member.

3. Means for controlling the flow of fluid in a conduit comprising, in combination, valve means in the conduit including a valve member movable between open and closed positions, relatively movable cooperating magnetic members one being a permanent magnet and the other being a body of Curie point metal, said valve member being operatively connected to and movable with one of said magnetic members and being in the closed position when said body of Curie point metal is below its Curie point and in the open position when said body of Curie point metal is above its Curie point, and circuit means for connecting an electrical current source across said body of Curie point metal for heating the same above its Curie point by current flow therethrough to change its magnetic properties and thereby effect movement of said valve member to the open position.

4. Means for controlling the flow of fluid in a conduit comprising, in combination, valve means in the conduit including a valve member movable between open and closed positions, magnet means operatively connected to and movable with said valve member, an electric heater element stationarily mounted in the field of said magnet means and formed of Curie point metal, and circuit means for connecting an electrical current source across said electric heater element for heating the same above its Curie point by current flow therethrough to change its magnetic properties and thereby effect movement of said valve member to the open position.

5. Means for controlling the flow of fluid in a conduit comprising, in combination, valve means in the conduit including a valve member movable between open and closed positions and a valve seat for receiving said valve member formed in part, at least, of Curie point metal, magnet means operatively connected to and movable with said valve member, said valve member being in the closed position when said Curie point metal is below its Curie point and in the open position when said Curie point metal is above its Curie point, and means for heating said valve seat to heat said Curie point metal above its Curie point to effect movement of said valve member to the open position.

6. Means for controlling the flow of fluid in a conduit comprising in combination, valve means in the conduit including a valve member movable between open and closed positions and a valve seat for receiving said valve member formed in part, at least, of Curie point metal, magnet means operatively connected to and movable with said valve member, said valve member being in the closed position when said Curie point metal is below its Curie point and in the open position when said Curie point metal is above its Curie point, and means for heating said valve seat to heat said Curie point metal above its Curie point to effect movement of said valve member to the open position, the heat applied to said valve seat for effecting movement of said valve member to the open position being sufficient to prevent condensation of the fluid thereon.

7. Means for controlling the flow of fluid in a conduit comprising, in combination, valve means in the conduit including a valve member movable between open and closed positions and a valve seat for receiving said valve member formed in part, at least, of Curie point metal, magnet means operatively connected to and movable with said valve member, said valve member being in the closed position when said Curie point metal is below its Curie point and in the open position when said Curie point metal is above its Curie point, and means for heating said valve seat to heat said Curie point metal above its Curie point to effect movement of said valve member to the open position, the Curie point metal of said valve seat being in substantial heat conducting relation with the fluid flowing through said conduit whereby, when heat is no longer applied thereto, it is rapidly cooled by conduction of heat therefrom to the fluid and said valve member is quickly moved to the closed position.

8. Means for controlling the flow of fluid in a conduit comprising, in combination, valve means in the conduit including a valve member movable between open and closed positions and a valve seat for receiving said valve member formed in part, at least, of Curie point metal, a permanent magnet operatively connected to and movable with said valve member, said valve member being in the closed position when said Curie point metal is below its Curie point and in the open position when said Curie point metal is above its Curie point, electrical heater means operatively associated with said valve seat, and circuit means for connecting said electrical heater means to a current source for energizing the same and thereby heating said Curie point metal above its Curie point to effect movement of said valve member to the open position, the heat applied to said valve seat for effecting movement of said valve member to the open position being sufficient to prevent condensation of the fluid thereon, and the Curie point metal to said valve seat being in substantial heat conducting relation with the fluid flowing through said conduit whereby, when heat is no longer applied thereto, it is rapidly cooled by conduction of heat therefrom to the fluid and said valve member is quickly moved to the closed position.

9. Means for controlling the flow of fluid in a conduit comprising, in combination, valve means in the conduit including a valve member movable between open and closed positions, magnet means operatively connected to and movable with said valve member, a body of Curie point metal stationarily mounted in the field of said magnet means, said valve member being in one position when said body of Curie point metal is below its Curie point and in another position when it is above the Curie point, and means for heating said body of Curie point metal above its Curie point to effect movement of said valve member from said one position to said other position.

10. Means for controlling the flow of fluid in a conduit comprising, in combination, a fluid tight casing interposed in said conduit and having a valve port through which the fluid can flow, a valve member cooperating with said port for controlling the flow of fluid through the same, relatively movable cooperating magnetic members one being arranged to produce magnetic flux and the other being a body of Curie point metal, said valve member being operatively connected to and movable with one of said magnetic members and the assembly being wholly contained within said casing and biased to a predetermined position with respect to said port, and means for changing the temperature of said Curie point metal to effect movement of said valve member to the open and closed positions and vice versa in accordance with the temperature of said Curie point metal with respect to its Curie point.

11. Means for controlling the flow of fluid in a conduit comprising, in combination, a fluid tight casing interposed in said conduit and having a valve port through which the fluid can flow, a valve member cooperating with said port for controlling the flow of fluid through the same, relatively movable cooperating magnetic members one being arranged to produce magnetic flux and the other being a body of Curie point metal, said valve member being operatively connected to and movable with one of said magnetic members and the assembly being wholly contained within said casing and biased to a predetermined position with respect to said port, and means for electrically heating said Curie point metal to effect movement of said valve member from one position to another whereby said port is capable of being opened and closed in accordance with the temperature of said Curie point metal with respect to its Curie point.

12. Means for controlling the flow of fluid in a conduit comprising, in combination, a fluid tight casing interposed in said conduit and having a valve port through which the fluid can flow, a valve member cooperating with said port for controlling the flow of fluid through the same, relatively movable cooperating magnetic members one being arranged to produce magnetic flux and the other being a body of Curie point metal, said valve member being operatively connected to and movable with one of said magnetic members and the assembly being biased to a predetermined position with respect to said port, and means for electrically heating said Curie point metal to effect movement of said valve member from one position to another whereby said port is capable of being opened and closed in accordance with the temperature of said Curie point metal with respect to its Curie point.

13. Means for controlling the flow of fluid in a conduit comprising, in combination, a fluid tight casing interposed in said conduit and having a valve port through which the fluid can flow, a valve member cooperating with said port for controlling the flow of fluid through the same, relatively movable cooperating magnetic members within said casing one being arranged to produce magnetic flux and the other being a body of Curie point metal, said valve member being operatively connected to and movable with one of said magnetic members and the assembly being biased to a predetermined position with respect to said port, an electric heater within said casing for heating said Curie point metal, and conductor means extending from said heater through said casing for connection to a current source.

14. Means for controlling the flow of fluid in a conduit comprising, in combination, a fluid tight casing interposed in said conduit and having a valve port through which the fluid can flow, a valve member cooperating with said port for controlling the flow of fluid through the same, relatively movable cooperating magnetic members within said casing one being arranged to produce magnetic flux and the other being a body of Curie point metal, said valve member being operatively connected to and movable with said body of Curie point metal and the assembly being biased to a predetermined position with respect to said port, an electric heater carried by said body of Curie point metal for heating the same, and conductor means extending from said heater through said casing for connection to a current source.

ROBERT A. WITTMANN.